United States Patent [19]

Dallabetta et al.

[11] Patent Number: 5,036,331
[45] Date of Patent: Jul. 30, 1991

[54] ADAPTIVE POLARIZATION COMBINER

[75] Inventors: Kyle A. Dallabetta, Seattle; Bernard J. Lamberty, Kent; Kenneth G. Voyce, Bellevue, all of Wash.

[73] Assignee: The Boeing Company, Seattle, Wash.

[21] Appl. No.: 408,777

[22] Filed: Sep. 18, 1989

[51] Int. Cl.$^5$ .................. H01Q 21/06; H04B 1/52
[52] U.S. Cl. ..................... 342/361; 333/118
[58] Field of Search .................. 342/361-366, 342/188; 333/118, 17, 2812

[56] References Cited

U.S. PATENT DOCUMENTS

| | | |
|---|---|---|
| 3,044,062 | 7/1962 | Katzin . |
| 3,310,805 | 3/1967 | Viglietta et al. . |
| 3,353,183 | 11/1967 | Giger . |
| 3,369,234 | 2/1968 | Bush et al. . |
| 3,540,045 | 11/1970 | Taylor . |
| 3,582,790 | 6/1971 | Curtis ............................ 333/117 |
| 3,720,941 | 3/1973 | Ares . |
| 3,883,872 | 5/1975 | Fletcher et al. . |
| 3,986,123 | 12/1976 | Tirro et al. . |
| 4,027,105 | 5/1977 | Kannowade . |
| 4,090,137 | 5/1978 | Soma et al. . |
| 4,264,908 | 4/1981 | Pelchat et al. . |
| 4,310,813 | 1/1982 | Yuuki et al. . |
| 4,737,793 | 4/1988 | Munson et al. . |
| 4,766,435 | 8/1988 | Wells . |

OTHER PUBLICATIONS

Lamberty et al, "Interference Suppression Using an Adaptive Polarization Combiner", Proc. of 1987 Antenna Applications Symposium, Allerton Park, Monticello, Ill., 9/23-25/87, pp. 1-15.
Makino, H., et al., "A New Adaptive Control System for Compensating Cross-Polarization-Coupling on the Up and/or Down Path in Frequency Reuse Satellite Communication Systems," AIAA 8th Communications Satellite Systems Conference, Apr. 1980, pp. 280-289.

Primary Examiner—Gregory C. Issing
Attorney, Agent, or Firm—Christensen, O'Connor, Johnson & Kindness

[57] ABSTRACT

A polarization diversity system (10) including an adaptive polarization combiner (14) is disclosed. The combiner receives input signals $V_{i1}$ and $V_{i2}^*$ of arbitrary relative phase and amplitude, produced in response to orthogonally polarized components of an incident electromagnetic field. The combiner includes a hybrid network (18) that performs the combination of the input $V_{i1}$ and $V_{i2}$ based on phase adjustments initiated by a feedback circuit (20). The feedback circuit includes a limit set and sensing circuit (26) that allows feedback signals $V_{c1}$, $V_{c2}$, $V_{c3}$, and $V_{c4}$ to be swept through a range suitable to phase shifters (28, 32, 36, and 38) included in the hybrid network, thus allowing different components to be more easily used in the hybrid network. Further, the combiner is constructed to function properly in the absence of one of the signals input to the combiner. More particularly, a sensing circuit (22) is employed to disable the sweep function in response to the occurrence of conditions representative of the absence of one of the input signals. As a result, the phase modulation that would otherwise have occurred is limited.

10 Claims, 11 Drawing Sheets

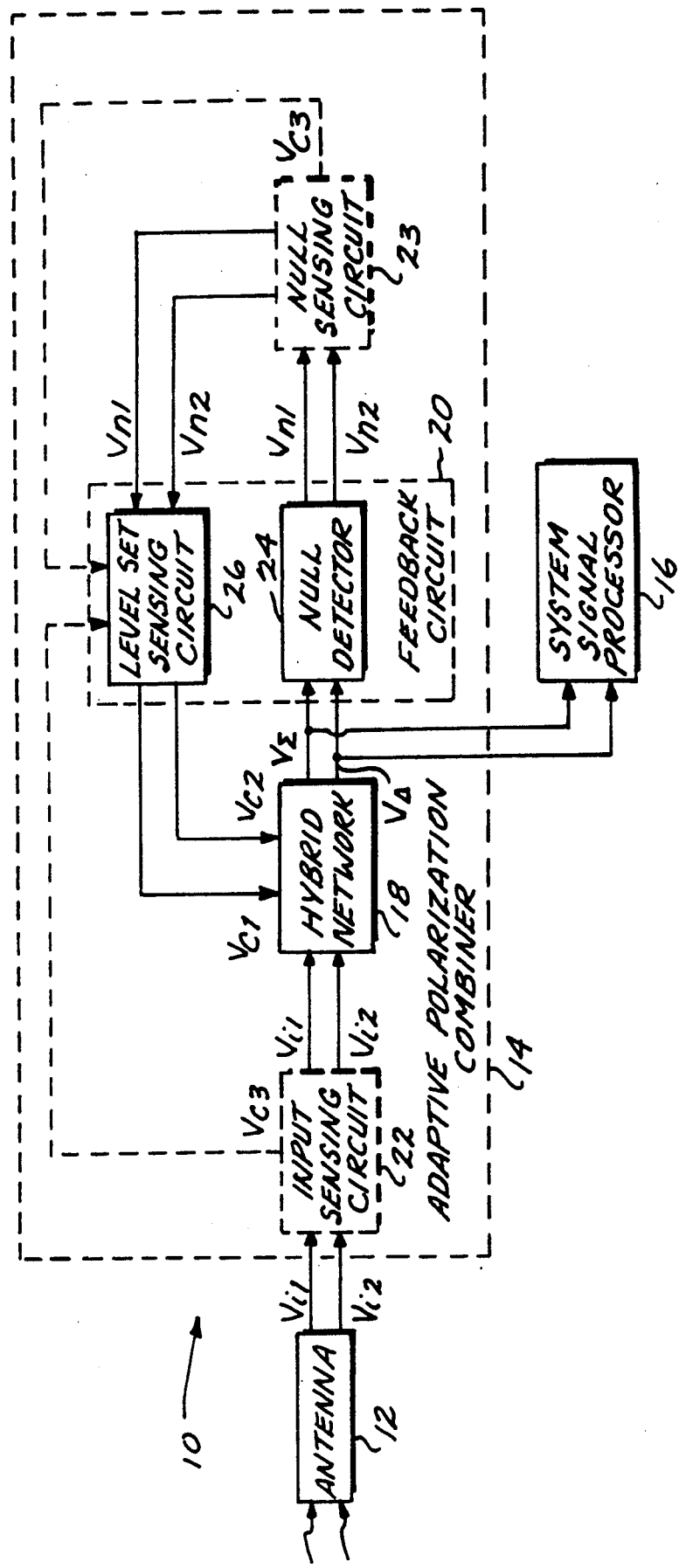

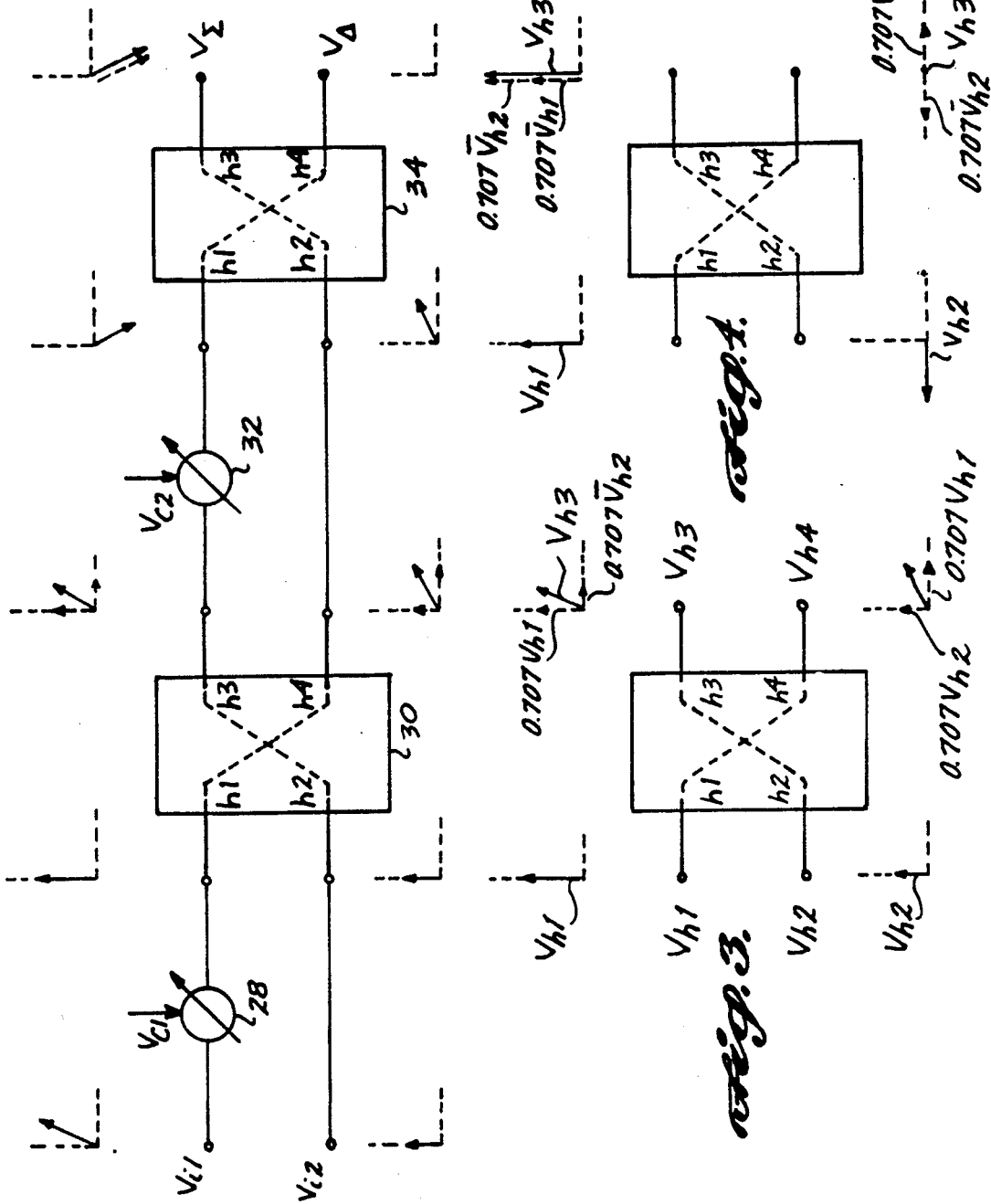

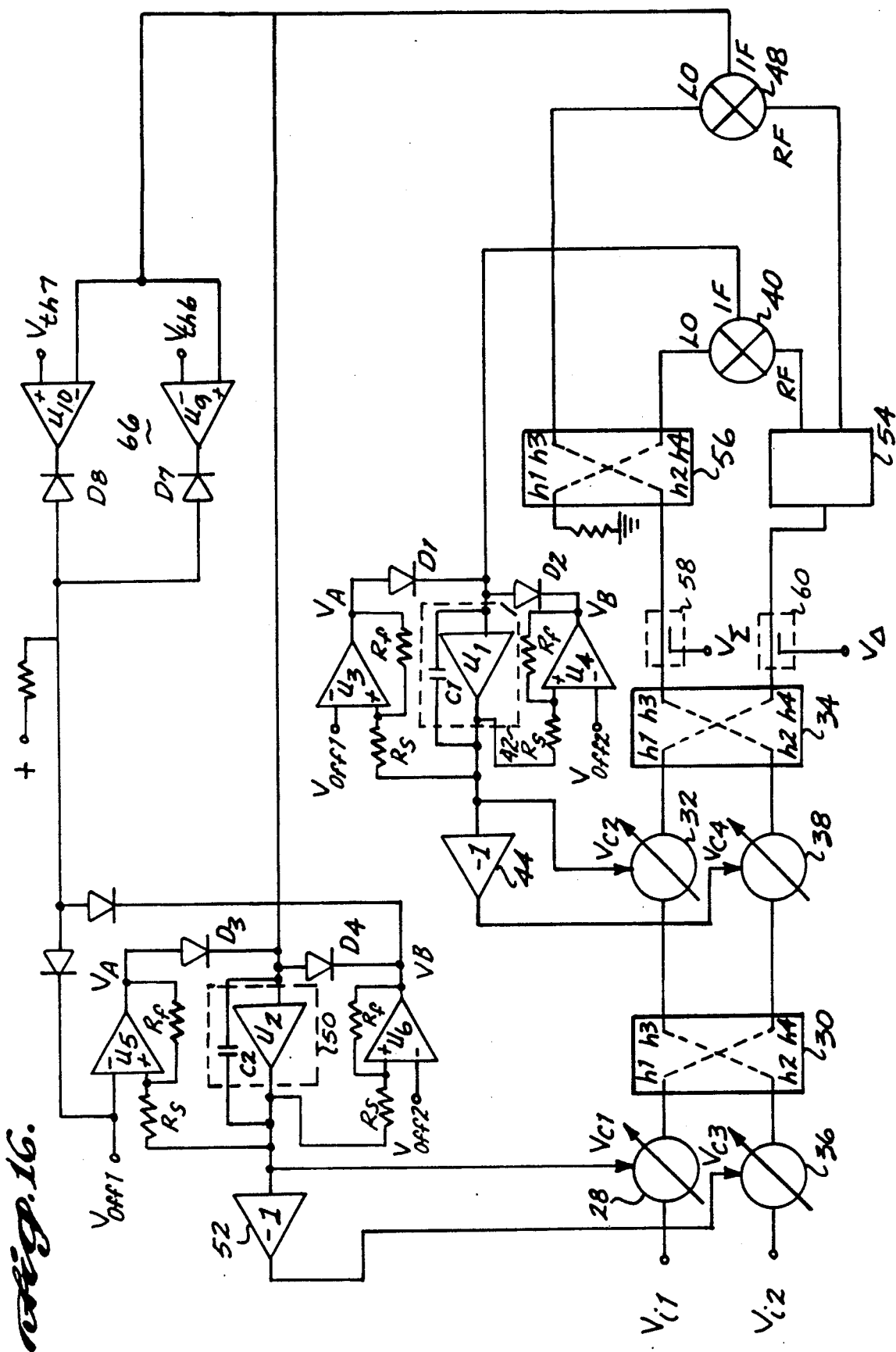

ADAPTIVE POLARIZATION COMBINER

FIELD OF THE INVENTION

This invention relates generally to circuits for combining signals of arbitrary relative amplitude and phase and, more particularly, to such circuits that automatically respond to changes in the signals' relative amplitude and phase.

BACKGROUND OF THE INVENTION

An electromagnetic field impinging on an antenna can be resolved into two orthogonal polarized components. For example, one electric field component may be aligned perpendicular to the earth's surface (i.e., vertically polarized), while the other electric field component runs parallel to the earth's surface (i.e., is horizontally polarized). These field components are received by orthogonally polarized antennas (e.g., a vertical dipole and a horizontal dipole) to produce corresponding signals whose relative phase and amplitude are a function of the incident field's polarization.

In many applications, it is desirable to combine these signals for processing or analysis. Such applications include signal enhancement, interference suppression, target signal analysis, adjacent channel separation, wind shear detection, and multipath reduction. A circuit, known as a polarization combiner, is provided to combine the signals, which, as noted, may be of arbitrary amplitude and phase. Preferably, the signals produced in response to the orthogonally polarized field components are combined into a single output exhibiting the total power of the two signals and an optimum signal-to-noise ratio.

As will be appreciated, the incident polarization of the field received by the antennas connected to the polarization combiner may change significantly with time. For example, the polarization may be affected by changes in the relative orientation of the transmitter and receiver or changes in the transmission medium. In any event, the polarization combiner must respond to such changes in the incident polarization, maintaining the total power and optimum signal-to-noise ratio at the output.

In that regard, polarization combiners have been developed that respond to changes in incident field polarization. For example, in an open-loop arrangement, the processing of signals corresponding to orthogonally polarized field components is manually adjusted to achieve optimum performance. The adjustments are made in response to information gained by monitoring the power of the output signal or by having some a priori knowledge of the incident field polarization. As will be appreciated, however, the primary disadvantage of such an approach is the slow response of the open loop to sudden changes in the incident polarization.

To improve the response time, an automatic, closed-loop polarization combiner has also been developed. As disclosed in U.S. Pat. No. 3,310,805 (Viglietta et al.), such a combiner includes two hybrid junctions, each of which is preceded by a variable phase shifter. This circuit receives the orthogonally polarized components of the incident field from two orthogonally polarized antennas and produces a maximized summation signal and a minimized "difference" or "null" signal, which are used to provide feedback to the variable phase shifters. More particularly, couplers provide the summation and difference signals to a pair of phase discriminators. These phase discriminators perform the scalar or dot product of the vector summation signal and the vector difference signal, as well as the dot product of the summation signal and the quadrature of the difference signal. The outputs of the phase discriminators are applied to servodrive mechanisms, which control the variable phase shifters to accomplish adaptive polarization combining.

As will be appreciated, with the polarization combiner properly adjusted, the summation signal will be maximized and the difference signal will be zero. In that case, the output of both phase discriminators will be zero and no adjustment will be made to the variable phase shifters. In the event a nonzero difference signal is produced, however, the phase discriminators will produce outputs that are proportional to the components of the difference signal that are in-phase and in-quadrature with the summation signal. In response, the servodrive mechanisms cause the variable phase shifters to restore the proper output conditions.

Conventional automatic polarization combiners of this type suffer several disadvantages. First, the manner in which the variable phase shifters can be adjusted is limited. In that regard, conventional phase shifters have input range limits that cannot be exceeded if proper operation is to occur. However, the phase shifters may be required to work outside these range limits if the polarization combiner is to accommodate any anticipated variations in incident field polarization. Thus, although this problem has not been addressed by the prior art, when the phase shifter reaches its operating limit, it must be able to effectively shift between that limit and a point in its operating range that is some multiple of 360 degrees away from the limit.

In addition, prior automatic polarization combiners do not work properly when one of the orthogonally polarized components of the incident field is not present. In this situation, the corresponding input signal is absent and the desired summation and null signals should be produced without adjustment to the phase shifters. The presence of circuit component imperfections, however, will likely cause the servodrive mechanisms to attempt to adjust the phase shifters. Because one of the signals is absent, there is no signal for the phase shifter to process, to accomplish the desired adjustment. As a result, the combiner would dither.

In view of these observations, it would be desirable to provide an adaptive polarization combiner that has a fast response time, is relatively simple in construction, properly responds when one of the input signals is absent, and can employ phase shifters subject to operating limits without impairing the combiner's ability to respond to changes in the incident field's polarization.

SUMMARY OF THE INVENTION

In accordance with this invention, an adaptive polarization combiner is provided for combining first and second input signals corresponding to orthogonally polarized components of an incident electromagnetic field to produce a sum output signal, having substantially all of the power of the input signals, and a null output signal. The combiner includes a hybrid network and a sensing circuit. The hybrid network receives the first and second input signals and produces the sum and null output signals in response. The sensing circuit, on the other hand, monitors the operation of the hybrid network ensuring that the hybrid network operates properly when one of the first and second input signals is absent.

The hybrid network further compensates for variations in the phase and magnitude of the first and second input signals. In that regard, the hybrid network includes first and second hybrids and first, second, third, and fourth phase shifters.

A null detector is included for controlling the hybrid network in response to the sum and null output signals. Specifically, the null detector includes first and second synchronous amplitude detectors, which produce first and second control signals indicative of the amplitude of the in-phase portion of the null output signal relative to the sum output signal and the amplitude of the quadrature portion of the null output signal relative to the sum output signal. First and second integrators then integrate the first and second control signals to produce first and second integrator outputs applied to the first and second phase shifters to control the operation of the hybrid network. First and second inverters invert the first and second integrator outputs and apply the inverted outputs to the control ports of the third and fourth phase shifters, respectively. A limit detection, or sweep, circuit monitors the first and second integrator outputs to ensure they are at a level suitable for use by the first and second phase shifters.

In one embodiment, the sensing circuit includes separate circuits for directly sensing the presence of the first and second input signals. The sensing circuit then maintains the first and second control signals in the event one of the input signals is not present. Alternatively, the sensing circuit may be designed to compare the null output signal with a threshold and disable a limit-sensing circuit when that threshold is not exceeded.

BRIEF DESCRIPTION OF THE DRAWINGS

The invention will presently be described in greater detail, by way of example, with reference to the accompanying drawings, wherein:

FIG. 1 is a block diagram of a polarization diversity system including an antenna, signal processor, and an adaptive polarization combiner constructed in accordance with this invention;

FIG. 2 is a schematic diagram of a hybrid network of the type included in the adaptive polarization combiner;

FIGS. 3 and 4 are schematic diagrams depicting the operation of 90-degree hybrids of the type included in the network of FIG. 2, under different circumstances;

FIG. 16 is an alternative embodiment of the combiner of FIG. 15.

DETAILED DESCRIPTION OF THE PREFERRED EMBODIMENT

Figures 5, 6:
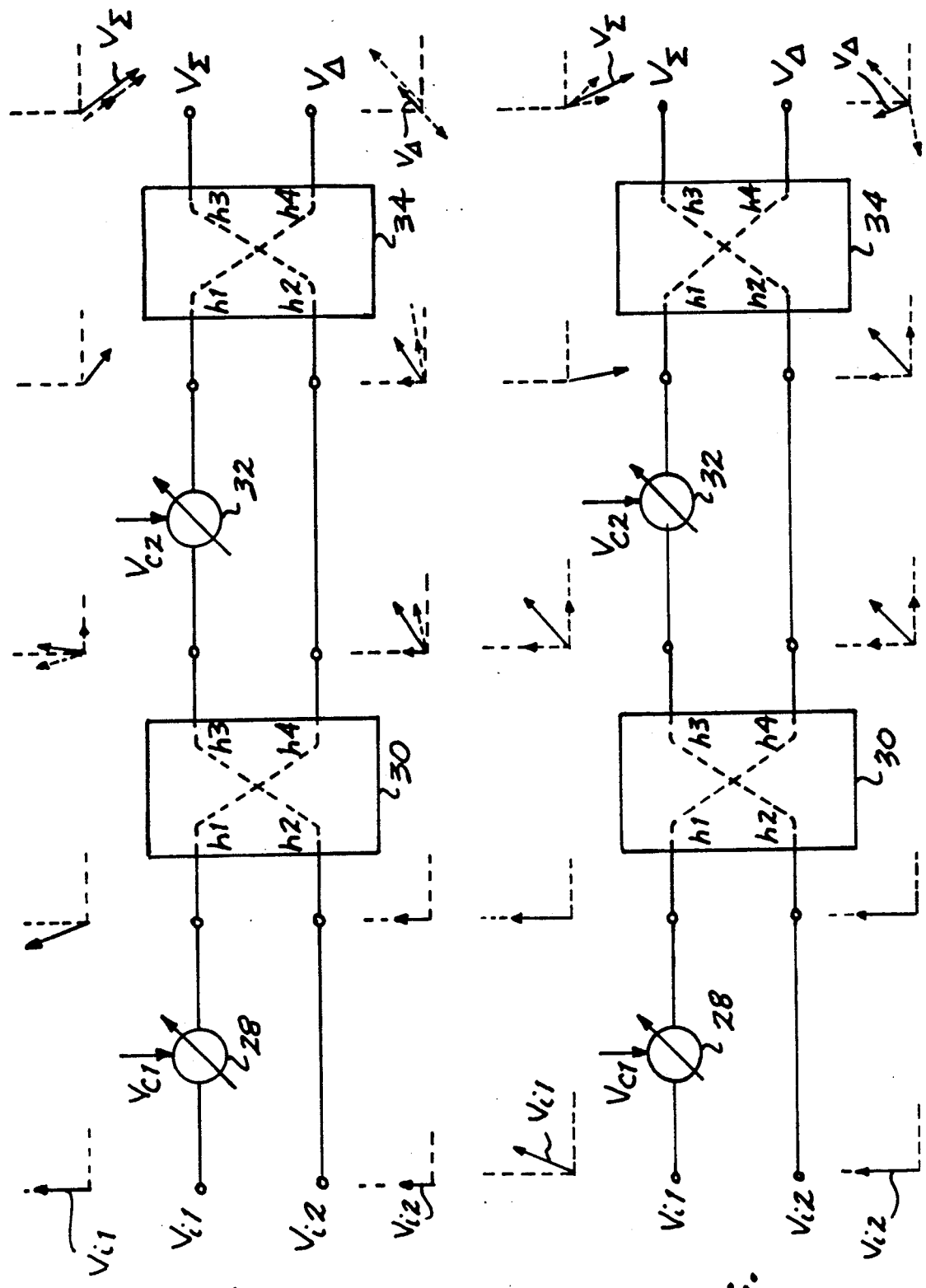
FIGS. 5 and 6 are schematic diagrams of the hybrid network of FIG. 2, depicting the response of the hybrid network to changes in the relative phase and amplitude of a pair of input signals.

Referring now to FIG. 1, a polarization diversity system 10 is shown. The polarization diversity system 10 receives and processes dual, orthogonally polarized components of an incident field, for any of a variety of purposes. For example, system 10 may be employed to accomplish signal enhancement, interference suppression, target signal analysis, adjacent channel separation, wind shear detection, or multipath reduction.

As shown in FIG. 1, the polarization diversity system 10 includes an antenna 12, adaptive polarization combiner 14, and system processor 16. Addressing these components individually, the antenna 12 produces dual input signals $V_{i1}$ and $V_{i2}$, which correspond to the orthogonal components of an arbitrarily polarized incident electric field. In most applications, the fields that antenna 12 is exposed to, as well as the signals $V_{i1}$ and $V_{i2}$ produced, exhibit a frequency in the radio frequency (RF) range of the electromagnetic spectrum. The antenna 12 is preferably of any suitable conventional design including, for example, vertical, and horizontal dipoles.

The adaptive polarization combiner 14 receives the input signals $V_{i1}$ and $V_{i2}$ from antenna 12 and combines them to produce a sum output signal $V_\Sigma$ and a null output signal $V_\Delta$. Although the input signals $V_{i1}$ and $V_{i2}$ may be of arbitrary amplitude and phase, the sum output signal $V_\Sigma$ produced by the adaptive polarization combiner 14 exhibits the total power of the input signals $V_{i1}$ and $V_{i2}$ and has an optimum signal-to-noise (S/N) ratio. The combiner 14 is further relatively simple in construction, allows components having limited operating ranges to be used without impairing the overall operation of the combiner, and operates properly in the absence of one of the input signals $V_{i1}$ or $V_{i2}$.

The system signal processor 16 receives the sum and null output signals $V_\Sigma$ and $V_\Delta$ to accomplish the desired objective of the polarization diversity system 10. In that regard, as suggested above, the signal processor 16 may be designed to accomplish signal enhancement, interference suppression, target signal analysis, adjacent channel separation, wind shear detection, or multipath reduction.

Discussing the adaptive polarization combiner 14 in greater detail, as shown in FIG. 1, it includes a hybrid network 18, feedback circuit 20, and an input-sensing circuit 22 or null-sensing circuit 23. Briefly, the hybrid network 18 is responsible for performing the basic combination of input signals $V_{i1}$ and $V_{i2}$ to produce the sum and null output signals $V_\Sigma$ and $V_\Delta$. The feedback circuit 20 monitors output signals $V_\Sigma$ and $V_\Delta$ to provide feedback signals $V_{c1}$ and $V_{c2}$, which are applied to the hybrid network 18 to control the manner in which the input signals $V_{i1}$ and $V_{i2}$ are combined.

The feedback circuit 20 includes a null detector 24 and level set and sensing circuit 26. The null detector 24 compares the sum and null output signals $V_\Sigma$ and $V_\Delta$ to detect changes in the input signals $V_{i1}$ and $V_{i2}$, corresponding to changes in the incident field polarization. As will be discussed in greater detail below, the null output signal $V_\Delta$ produced when the input signals $V_{i1}$ and $V_{i2}$ undergo an amplitude change is orthogonal to the null output signal $V_\Delta$ produced when signals $V_{i1}$ and $V_{i2}$ experience a phase change. The null detector 24 responds to these changes by producing signals $V_{n1}$ and $V_{n2}$. These signals are applied to the level set and sensing circuit 26, which produces the feedback signals $V_{c1}$ and $V_{c2}$ used by hybrid network 18 to maintain the proper operation of the adaptive polarization combiner 14. The input-sensing circuit 22 and null-sensing circuit 23 are alternatively used to disable a portion of feedback circuit 20 in response to certain operating conditions.

Reviewing the components of the adaptive polarization combiner 14 in still greater detail, reference is had to FIG. 2. As shown, the hybrid network 18 includes a first adjustable phase shifter 28, first 90-degree hybrid 30, second adjustable phase shifter 32, and second 90-degree hybrid 34. Each input signal $V_{i1}$ and $V_{i2}$ is represented as a vector whose length is proportional to the signal's magnitude and whose orientation is representative of its phase angle.

The first input signal $V_{i1}$ is applied through the first phase shifter 28 to input port h1 of hybrid 30, while the other input signal $V_{i2}$ is applied directly to input port h2 of hybrid 30. Phase shifter 32 connects output port h3 of hybrid 30 to input port h1 of hybrid 34 and the output port h4 of hybrid 30 is connected directly to the input port h2 of hybrid 34. Finally, the sum output signal $V_\Sigma$ is produced at output port h3 of hybrid 34, while the null output signal $V_\Delta$ is produced at output port h4 of hybrid 34.

As will be discussed in greater detail below, the hybrid network 18 is controllably operated to ensure that the input signals $V_{i1}$ and $V_{i2}$ exhibit the following relationships as they are processed. As noted previously, the input signals $V_{i1}$ and $V_{i2}$ produced by antenna 12 may exhibit arbitrary amplitude and phase. The variable phase shifter 28 responds to the feedback signal $V_{c1}$ to ensure that the input signals $V_{i1}$ and $V_{i2}$ are in phase at the input ports h1 and h2 of hybrid 30. Hybrid 30 then produces equal amplitude signals at its output ports h3 and h4. The phase of these signals depends on the ration of the magnitudes of input signals $V_{i1}$ and $V_{i2}$. Feedback signal $V_{c2}$ causes phase shifter 32 to adjust the relative phase of the signals output by hybrid 30 so that equal amplitude, orthogonal signals are provided to the input ports h1 and h2 of hybrid 34. As a result, the sum output signal $V_\Sigma$ includes the total power of the input signals $V_{i1}$ and $V_{i2}$, while the null output signal $V_\Delta$ is at a minimum.

Further discussing these various components of hybrid network 18, phase shifters 28 and 32 can have any of a wide variety of constructions. As previously noted, phase shifters 28 and 32 respond to signals $V_{c1}$ and $V_{c2}$ from the feedback circuit 20 to provide the necessary phase adjustments to the signals processed by the hybrid network 18. Phase shifters 28 and 32 must be capable of providing at least 360 degrees of phase shift in response to the feedback signals $V_{c1}$ and $V_{c2}$. However, the phase shifters may have a limited operating range and still accommodate any variation in incident field polarization because the feedback signals $V_{c1}$ and $V_{c2}$ are automatically reset by the feedback circuit 20 to fall within the range of phase shifters 28 and 32, as described in greater detail below.

Addressing the hybrids 30 and 34, these hybrids are preferably 90-degree hybrids but can be, for example, 180-degree hybrids. The 90-degree hybrids 30 and 34 operate in the following manner. For the convention shown in FIG. 2, a 90-degree hybrid produces an output at port h3 that is proportional to the vector sum of the input at port h1 and the input at port h2, with the input at port h2 delayed in phase by 90 degrees. Similarly, the output produced at port h4 is proportional to the vector sum of the input at port h2 and the input at the port h1, with the input at the port h1 being delayed in phase by 90 degrees.

Taking a specific example, reference is had to FIG. 3. Assume that the input signals $V_{h1}$ and $V_{h2}$ are of arbitrary magnitude but, as shown, are in phase. The 90-degree hybrid then splits input $V_{h1}$ between outputs h3 and h4, with the portion provided to output port h3 having a magnitude equal to 0.707 times the magnitude of $V_{h1}$ and being in phase with $V_{h1}$. On the other hand, the portion of $V_{h1}$ applied to output port h4 has a magnitude equal to 0.707 times that of $V_{h1}$, delayed in phase by 90 degrees from $V_{h1}$. Similarly, the input signal $V_{h2}$ is split between output ports h3 and h4, with the portion applied to output port h4 being equal in magnitude to 0.707 times that of $V_{h2}$ and being equal in phase. In addition, the portion applied to output port h3 is equal to 0.707 times $V_{h2}$, but delayed in phase by 90 degrees.

As shown in FIG. 3, the output signal $V_{h3}$ is equal to the vector sum of the contributions of the inputs $V_{h1}$ and $V_{h2}$ at output port h3. Similarly, the output signal $V_{h4}$ is equal to the vector sum of the contributions of signals $V_{h1}$ and $V_{h2}$ at output port h4. With the inputs $V_{h1}$ and $V_{h2}$ of the hybrid equal in phase but of arbitrary magnitude, as shown in FIG. 3, the outputs $V_{h3}$ and $V_{h4}$ of the hybrid will be equal in amplitude but have a phase relationship that depends on the relative magnitude of input signals $V_{h1}$ and $V_{h2}$. Thus, the hybrid illustrated in FIG. 3 is operating in the same manner as hybrid 30 of the hybrid network 18 shown in FIG. 2, when network 18 is properly adjusted.

To review the operation of a hybrid under conditions similar to those experienced by hybrid 34 of network 18 when network 18 is properly adjusted, reference is had to FIG. 4. As shown, the input signals $V_{h1}$ and $V_{h2}$ are equal in magnitude, but orthogonal in phase. As in the arrangement described in connection with FIG. 3, the input $V_{h1}$ is split between output ports h3 and h4, with the portion applied to output port h3 having a magnitude equal to 0.707 times $V_{h1}$ and being in phase with $V_{h1}$. The portion applied to output port h4, in turn, has a magnitude equal to 0.707 times $V_{h1}$ but is delayed in phase by 90 degrees. Similarly, input $V_{h2}$ is split between output ports h3 and h4, with 0.707 times $V_{h2}$ being produced in phase at output terminal h4 and 0.707 times $V_{h2}$ being provided with a 90-degree phase delay at output port h3.

As will be appreciated, the two components of $V_{h1}$ and $V_{h2}$ provided to output port h3 both have the same phase as $V_{h1}$. Because $V_{h1}$ and $V_{h2}$ are equal, $V_{h3}$ thus has a magnitude that is approximately equal to 1.4 times the magnitude of $V_{h1}$ (or $V_{h2}$). Similarly, the two components produced at output port h4 are also equal in magnitude, but 180 degrees apart in phase. As a result, these components cancel and their vector sum at port h4 is equal to zero.

In view of these observations, it will be appreciated that a sum output signal $V_\Sigma$ having the combined power of the two input signals $V_{i1}$ and $V_{i2}$ is produced when the signals at input ports $h_1$ and $h_2$ of hybrid 34 are equal in amplitude and orthogonal in phase. To maintain the desired signal amplitude equality at ports h1 and h2 of hybrid 34, phase shifter 28 is controlled via the feedback signal $V_{c1}$. Similarly, to control the relative phase of the signals at input ports h1 and h2 of hybrid 34, phase shifter 32 is controlled via feedback signal $V_{c2}$.

Before leaving the discussion of hybrid network 18, it will be helpful to consider the response of the various components of network 18 to changes in the relative amplitude or phase of the input signals $V_{i1}$ and $V_{i2}$. Taking first the situation in which the relative phase of the input signals $V_{i1}$ and $V_{i2}$ changes, reference is had to FIG. 5. As shown, the phase angle of input signal $V_{i1}$ is changed to equal the phase angle of input $V_{i2}$, without altering the two signals' magnitudes. Before the influence of this phase shift ripples through the hybrid network 18 and causes feedback circuit 20 to adjust the operation of network 18, the signal $V_{c1}$ applied to phase shifter 1 will be the same as it was in the scenario depicted in FIG. 2.

In this situation, the magnitude of the signal input to port h1 of hybrid 30 will remain the same but it will no longer be in phase with the signal input to port h2 of hybrid 30. As a result, the relative magnitudes of the signals at output ports h3 and h4 of hybrid 30 will be different than they were in FIG. 2. However, the relative phase difference between the signals at ports h3 and h4 will not change significantly.

Thus, the conditions required for producing the desired sum and null outputs $V_\Sigma$ and $V_\Delta$ are no longer maintained and, as will be appreciated from a comparison of FIGS. 2 and 5, the sum output $V_\Sigma$ no longer includes the total power of the two input signals $V_{i1}$ and $V_{i2}$ and the null output $V_\Delta$ is no longer zero. Furthermore, the phase of the null output $V_\Delta$ is orthogonal to the phase of the sum output $V_\Sigma$. The sense of orthogonality ($\pm 90$ degrees) depends on the sense of the phase displacement of $V_{i1}$ relative to its initial condition.

In contrast, when the relative phase of the input signals $V_{i1}$ and $V_{i2}$ remains the same but their relative magnitudes change, the effect is shown in FIG. 6. For example, assume that the amplitude of input $V_{i2}$ has been increased to be roughly equal to that of $V_{i1}$, without changing the relative phase of the two signals $V_{i1}$ and $V_{i2}$. Before the signals ripple through the hybrid network 18 and cause the feedback circuit 20 to adjust the operation of network 18, the feedback signals $V_{c1}$ and $V_{c2}$ will be unchanged. Thus, phase shifter 28 still brings input signals $V_{i1}$ and $V_{i2}$ in phase at input ports h1 and h2 of hybrid 30.

Because the relative magnitude of the inputs to ports h1 and h2 of hybrid 30 has now changed, the relative phase of the outputs produced at ports h3 and h4 of hybrid 30 also changes. The feedback signal $V_{c2}$ has not changed, however, and phase shifter 32 makes the same phase adjustment to the signal output from port h3 of hybrid 30 as it did in the circumstances depicted in FIG. 2. As a result, although the inputs to ports h1 and h2 of hybrid 34 are equal in magnitude, they are no longer orthogonal in phase.

As will be appreciated from the earlier discussions, in this circumstance, the polarization combiner is no longer able to produce the desired outputs. As shown in FIG. 6, the sum output signal $V_\Sigma$ produced at port h3 of hybrid 34 no longer includes the total power of the input signals $V_{i1}$ and $V_{i2}$ and a nonzero null output signal $V_\Delta$ is produced at output port h4 of hybrid 34. In this case, $V_\Delta$ is either in phase with $V_\Sigma$ or of opposite phase, with the phase sense depending on whether the ratio of the magnitudes of $V_{i1}$ and $V_{i2}$ increases or decreases.

Both of the preceding situations generally occur in response to changes in the polarization of the incident electric field. When the polarization combiner 14 is operating, the feedback circuit 20 uses the sum output signal $V_\Sigma$ and the nonzero null output signal to restore the desired output conditions via feedback applied to phase shifters 28 and 32.

As previously discussed, the presence of the null signal $V_\Delta$ is used to detect the success of the hybrid network 18 in accomplishing the desired polarization combination. As will be appreciated, however, an arrangement could be developed in which the presence of equal amplitude orthogonal signals at the input ports h1 and h2 of hybrid 34 is directly sensed to determine the status of network 18. In such an arrangement, feedback circuit 20 would be constructed to sense the variation of these signals from set amplitude and phase criteria and provide feedback signals $V_{c1}$ and $V_{c2}$ to phase shifters 28 and 32 to adjust the signals input to hybrid 34 accordingly.

In the preceding discussion of hybrid network 18, the phase adjustments required to accomplish the desired polarization combination were treated as having been produced by phase shifters present in only one of the two input lines. For example, the input signal $V_{i1}$ must pass through phase shifter 28 before reaching the input port h1 of hybrid 30, while input signal $V_{i2}$ is applied directly to input port h2. As will be appreciated, however, this arrangement would introduce a phase delay and possibly an amplitude attenuation into the line between $V_{i1}$ and $V_\Sigma$, which would not be correspondingly introduced into the line between $V_{i2}$ and $V_\Delta$. To maximize the bandwidth of system 10, the phase delay and amplitude attenuation in the path between $V_{i1}$ and $V_\Sigma$ must be equal to the phase delay and amplitude attenuation between $V_{i2}$ and $V_\Delta$.

Figure 7:
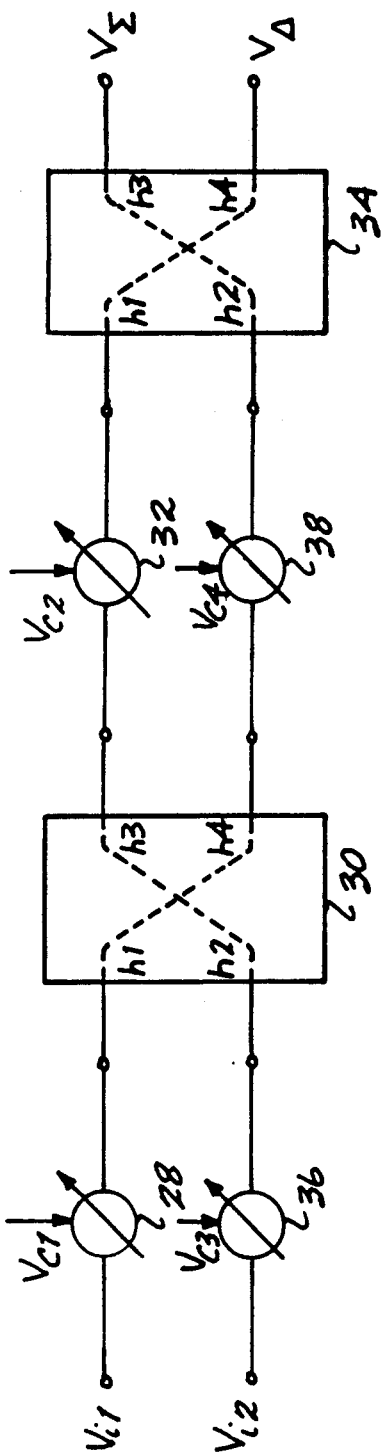
FIG. 7 is a schematic diagram of the hybrid network of FIG. 2, in which four phase shifters are employed to introduce balanced amplitudes and delays into the signal paths of the hybrid network.

To that end, the relative phase angle between the signals present on the two lines is preferably adjusted by balanced phase shifters that cooperatively produce the phase shifts previously described as being accomplished by single phase shifters. In the preferred embodiment shown in FIG. 7, hybrid network 18 includes a third adjustable phase shifter 36 coupled between $V_{i2}$ and input port h2 of hybrid 30 to compensate for the delay and attenuation introduced by phase shifter 28. A fourth adjustable phase shifter 38 is similarly provided between the output port h4 of hybrid 30 and the input port h2 of hybrid 34 to compensate for the phase delay and amplitude attenuation introduced by phase shifter 32. As will be discussed in greater detail below, the feedback signals $V_{c3}$ and $V_{c4}$ applied to the third and fourth phase shifters 36 and 38, respectively, are simply the inverses of feedback signals $V_{c1}$ and $V_{c2}$. It will be recognized by those skilled in the art that the feedback signals $V_{c1}$, $V_{c2}$, $V_{c3}$, and $V_{c4}$ applied to phase shifters 28, 36, 30, and 38 can be used to determine the polarization of the incident electric field.

Addressing now the construction and operation of null detector 24 in greater detail, null detector 24 compares the phase of the null output or error signal $V_\Delta$ with that of the sum output signal $V_\Sigma$ to determine if and how the input signals $V_{i1}$ and $V_{i2}$ have changed in response to a change in the incident field's polarization. This information is then used to determine what adjustment, if any, to the phase shifters 28, 32, 36, and 38 is required to restore the hybrid network 18 to proper operation. In the preferred arrangement, null detector 24 includes a pair of double-balanced mixers operating in an in-phase and quadrature arrangement as synchronous amplitude detectors.

Figure 8:
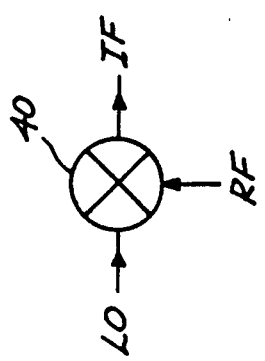
FIG. 8 is a schematic diagram of a synchronous amplitude detector included as part of a feedback loop employed by the adaptive polarization combiner shown in FIG. 1.

More particularly, such a null detector 24 will include a synchronous amplitude detector 40 of the type illustrated in FIG. 8. As shown, detector 40 includes a radio frequency (RF) input port, a local oscillator (LO) input port, and an intermediate frequency (IF) output port. As will be discussed in greater detail below, the RF and LO signals applied to the RF and LO input ports of detector 40 have the same frequency. As a result, a DC signal is produced at the IF output port. The magnitude of this DC signal is a function of the relative phase $\phi_{LO}$ and $\phi_{RF}$ and the relative magnitude of the signals applied to the LO and RF input ports, as shown in FIG. 9.

As illustrated, the DC level of the signal produced at the IF output port is zero if the signals applied to the LO and RF input ports have the same frequency and are orthogonal (90 degrees out of phase). The DC level is at a maximum positive value if the signals applied to the LO and RF input ports are in phase. In contrast, the DC level is at a maximum negative value if the signals applied to the LO and RF input ports are 180 degrees out of phase. In both instances, the maximum level is related to the magnitude of the RF signal ($V_\Delta$).

Figure 9:
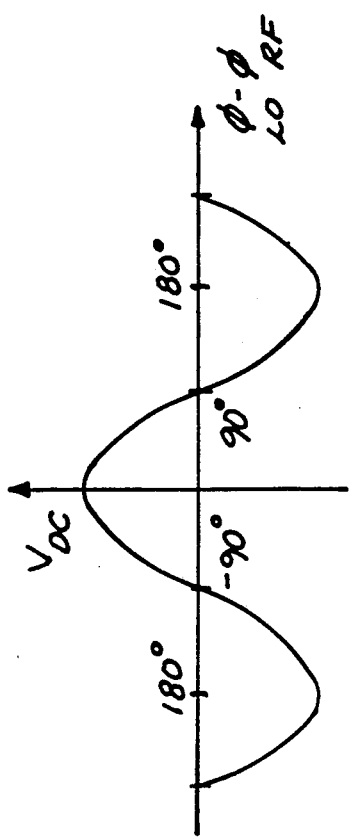
FIG. 9 is a graphic illustration of the operation of the synchronous amplitude detector of FIG. 8.

As will be appreciated from FIG. 9, if the signals applied to the LO and RF input ports are originally orthogonal, a positive polarity output will be produced at the IF port when the phase difference ($\phi_{LO} - \phi_{RF}$) between the signals at the LO and RF input ports decreases. On the other hand, if the phase difference ($\phi_{LO} - \phi_{RF}$) of the two signals drifts farther apart than 90 degrees, a negative polarity output will be produced. It is these properties of detector 40 that null detector 24 uses to compare the relative phase of the sum and null output signals $V_\Sigma$ and $V_\Delta$ of hybrid network 18.

Figure 10:
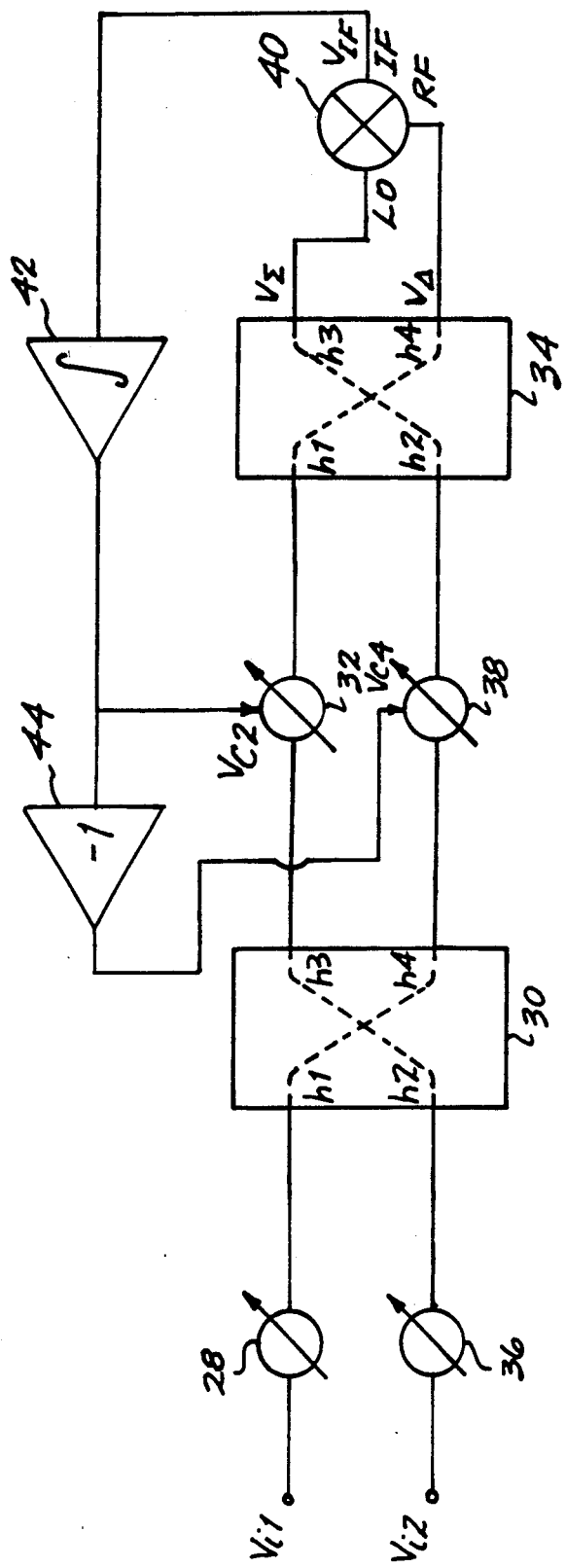
FIG. 10 is a block diagram of a portion of the adaptive polarization combiner including one feedback path.

Addressing now the manner in which the synchronous amplitude detector 40 is employed by null detector 24, reference is had to FIG. 10, which illustrates a first section of null detector 24. As shown, the sum output signal $V_\Sigma$ from hybrid 34 is applied to the LO input port of detector 40 because it has the most available power. The null output signal $V_\Delta$ is applied to the RF input port of detector 40. As previously suggested, the sum and null output signals $V_\Sigma$ and $V_\Delta$ have the same frequency, although the null output signal $V_\Delta$ will be zero when the hybrid network 18 is properly adjusted.

The synchronous amplitude detector 40 indirectly senses those changes in the null output signal $V_\Delta$ that are due to variations in the relative phase (as opposed to relative magnitude) of the signals applied to input ports h1 and h2 of hybrid 34, and produces an output signal $V_{IF}$ in response. This output $V_{IF}$ is then integrated by an integrator 42 to produce the feedback signal $V_{c2}$ applied to phase shifter 32. The output of integrator 42 is further processed by an inverting amplifier 44 to produce the feedback signal $V_{c4}$ applied to phase shifter 38.

If a change in the incident field polarization causes the magnitude ratio of input signals $V_{i1}$ and $V_{i2}$ to decrease, the phase difference between the signals applied to input ports h1 and h2 of hybrid 34 will be greater than 90 degrees, and a nonzero null output $V_\Delta$ will be produced at terminal h4 of hybrid 34. This situation was previously discussed in connection with FIG. 6. As shown in FIG. 6, the null output signal $V_\Delta$ present at port h4 of hybrid 34 has a component that is 180 degrees out of phase with the sum output signal $V_\Sigma$ present at port h3. As will be recalled from FIG. 9, the output $V_{IF}$ of synchronous amplitude detector 40 is, thus, at a negative DC level.

In contrast, if a change in the incident field polarization causes the magnitude ratio of input signals $V_{i1}$ and $V_{i2}$ to increase, the phase difference between the signals applied to input ports h1 and h2 of hybrid 34 will be greater than 90 degrees, as discussed in connection with FIG. 6. Then, the null output signal $V_\Delta^*$ will have a component that is in phase with the sum output signal $V_\Sigma$. In this situation, synchronous amplitude detector 40 responds by producing an output $V_{IF}$ having a positive DC value.

Regardless of its polarity, the output $V_{IF}$ is filtered and integrated by integrator 42 to produce the DC control voltage $V_{c2}$ applied to phase shifter 32. The inverse of the integrator's output is also produced by amplifier 44 and applied to phase shifter 38 as the DC control voltage $V_{c4}$.

In that regard, when the relative phase of the inputs to ports h1 and h2 of hybrid 34 is less than 90 degrees and a positive value for $V_{c2}$ is produced by integrator 42, the relative phase angle of the signal applied to input port h1 of hybrid 34 is advanced by phase shifters 32 and 38 to restore orthogonality between the two inputs to hybrid 34. On the other hand, when the relative phase of the inputs to ports h1 and h2 of hybrid 34 is greater than 90 degrees and a negative value for $V_{c2}$ is produced by integrator 42, phase shifters 32 and 38 cooperatively retard the phase angle of the input to port h1 of hybrid 34 to restore orthogonality.

As previously noted, the portion of the null detector 24 shown in FIG. 10 responds to changes in the relative phase of the signals applied to input ports h1 and h2 of hybrid 34. It does not, however, respond to changes in the relative amplitudes of these signals, as would be caused by a change in the relative phase of input signals $V_{i1}$ and $V_{i2}$. This case, i.e., the operation of hybrid 34 when signals of unequal amplitude are applied to input ports h1 and h2 of hybrid 34, was discussed in reference to FIG. 5. As shown there, null output signal $V_\Delta$ will have a component that is orthogonal to the sum output signal $V_\Sigma$ present at the port h3. As will be appreciated from FIG. 9, when the null output signal $V_\Delta$ applied to the RF port of synchronous amplitude detector 40 is orthogonal to the sum output signal $V_\Sigma$ applied to the LO port, the detector output $V_{IF}$ will be zero. Thus, the circuit of FIG. 10 could not be used to correct for amplitude mismatches at the input ports h1 and h2 of hybrid 34.

Figure 11:
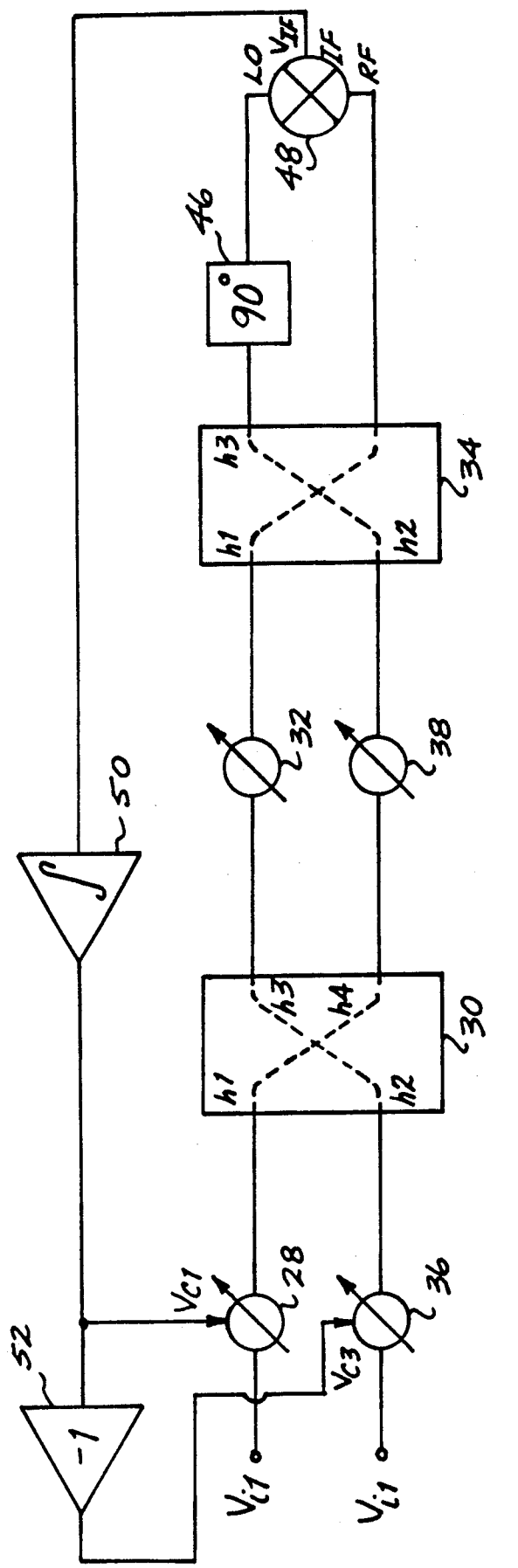
FIG. 11 is a block diagram of another portion of the adaptive polarization combiner including another feedback path.

Instead, a 90-degree phase shift must be applied to the signal $V_\Sigma$ by a 90-degree phase shifter 46 included as part of a second section of null detector 24 and depicted in FIG. 11. The output of phase shifter 46 can then be applied to the LO input of a second synchronous amplitude detector 48, allowing a nonzero output $V_{IF}$ to be produced. This output $V_{IF}$ is applied to a second integrator 50 and inverting amplifier 52 to produce the control signals $V_{c1}$ and $V_{c3}$ required to control phase shifters 28 and 36. In response, phase shifters 28 and 36 restore the equality of the magnitude of the signals applied to input ports h1 and h2 of hybrid 34, in a manner similar to that discussed in connection with FIG. 10.

Figure 12:
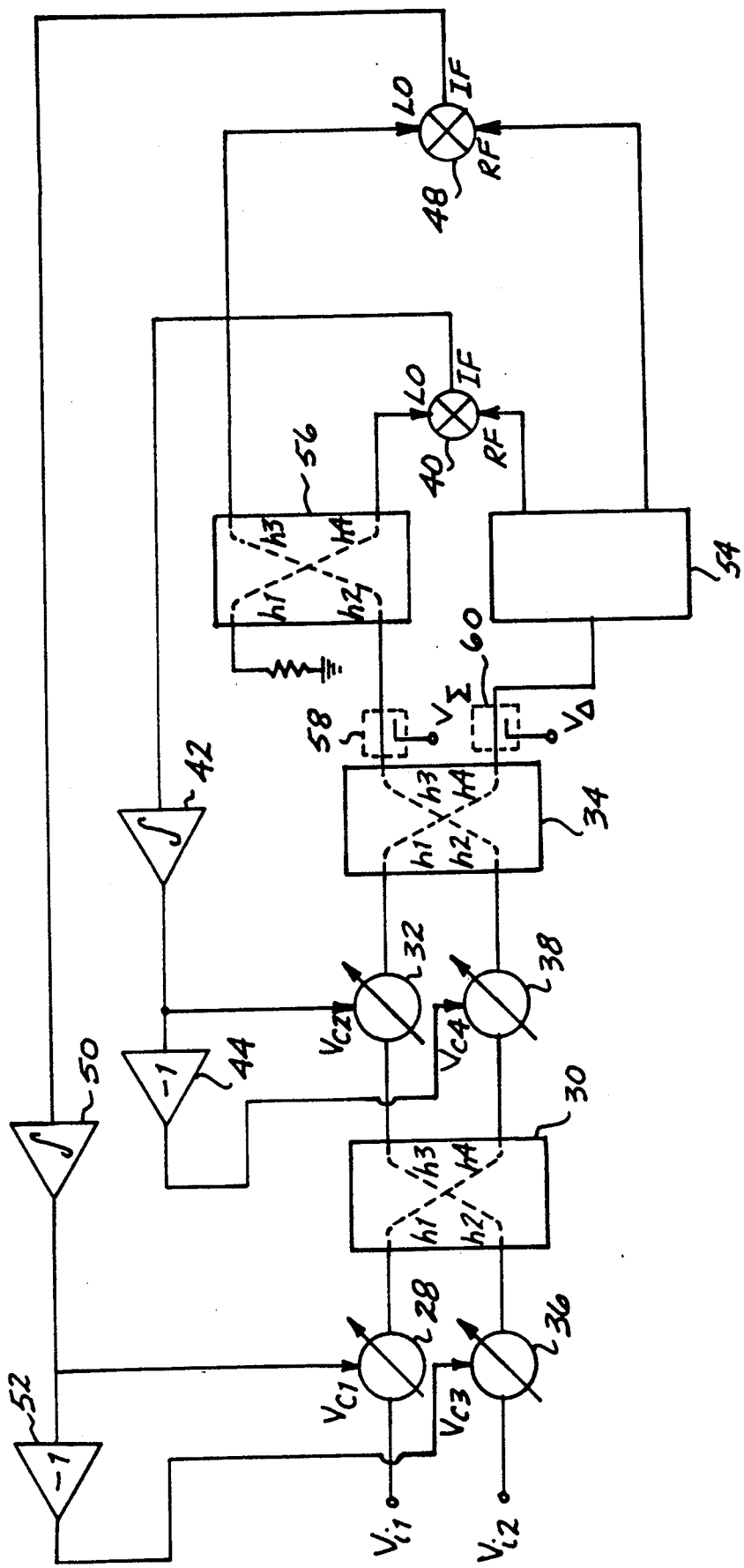
FIG. 12 is a more detailed schematic diagram of the adaptive polarization combiner of FIG. 1, including both feedback paths of FIGS. 10 and 11.

As will be appreciated from the preceding remarks, the null detector 24 adjusts the operation of hybrid network 18 in the event that the signals applied to input ports h1 and h2 of hybrid 34 depart from either quality of amplitude or orthogonality of phase. To accomplish this, both synchronous amplitude detectors 40 and 48 are incorporated into a single configuration. Thus, the null detector 24 basically combines the two sections shown in FIGS. 10 and 11, along with some mechanism for providing the sum and null output signals $V_\Sigma$ and $V_\Delta$ to both detector 40 and detector 48 in the right phase relationship. The resultant arrangement is illustrated in FIG. 12.

As shown, a power splitter 54 is included between port h4 of hybrid 34 and the RF ports of synchronous amplitude detectors 40 and 48. Power splitter 54 applies equal components of the null output signal $V_\Delta$ to the RF ports of both detectors 40 and 48. A third 90-degree hybrid 56 is also connected between port h3 of hybrid 34 and the LO ports of detectors 40 and 48. Hybrid 56 couples the sum output signal $V_\Sigma$ to the LO inputs of detectors 40 and 48, providing no phase adjustment to the signal applied to the LO port of detector 40 and a 90-degree phase adjustment to the signal applied to the LO port of detector 48. The ability of hybrid 56 to accomplish this relative phase adjustment will be readily appreciated given the discussion of the hybrid operation provided in connection with FIGS. 3 and 4.

Finally, it should be noted that a sum output sensor 58 and null output sensor 60 are included in the circuit to make the sum and null output signals $V_\Sigma$ and $V_\Delta$ available to the system signal processor 16. In the arrangement shown in FIG. 12, sum output sensor 58 is coupled between output port h3 of hybrid 34 and input port h2 of hybrid 56. The null output sensor 60 is, in turn, coupled between the output port h4 of hybrid 34 and the input to power splitter 54.

The next component of the adaptive polarization combiner 14 to be discussed is the level set and sensing circuit 26. Briefly, this circuit 26 maintains the feedback control voltages $V_{c1}$, $V_{c2}$, $V_{c3}$, and $V_{c4}$ within the input range of phase shifters 28, 32, 36, and 38, regardless of changes in the relative amplitude and phase of input signals $V_{i1}$ and $V_{i2}$ caused by changes in the incident field polarization. As a result, a wider variety of phase shifters can successfully be incorporated into combiner 14, while maintaining the desired operation.

Figure 13:
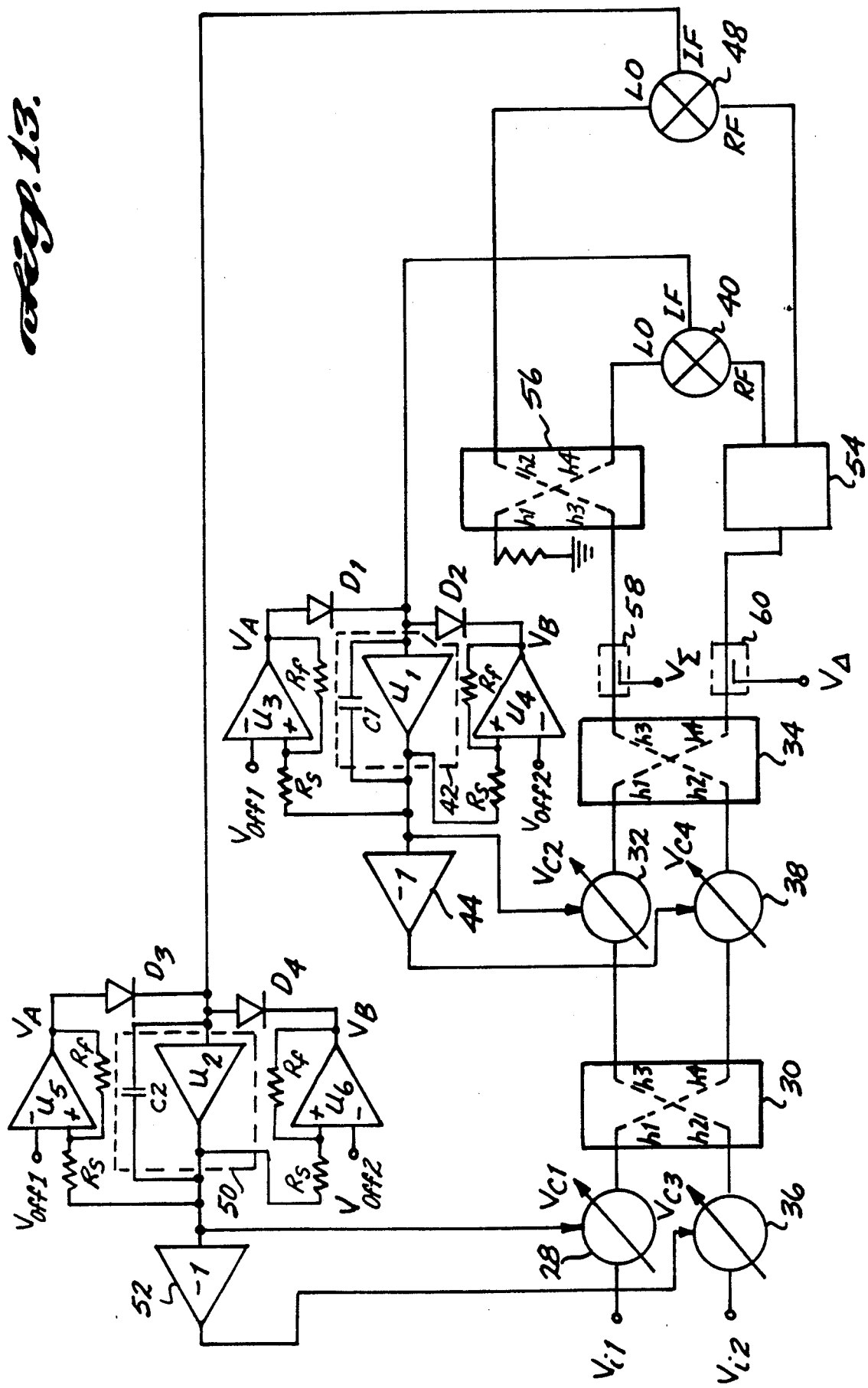
FIG. 13 is a more detailed diagram of the adaptive polarization combiner of FIG. 12, including a limit set and sensing circuit.

Referring to FIG. 13, a more detailed illustration of the level set and sensing circuit 26 of FIG. 1 is provided, incorporated into the basic circuit of FIG. 12. As shown, the integrator 42 of FIG. 12 is represented in greater detail as including an operational amplifier $U_1$, with a capacitor $C_1$ connected between its inverting input and output terminals. Similarly, integrator 50 includes an operational amplifier $U_2$ having its output and inverting input terminals connected by a capacitor $C_2$. The sensing circuit 26 includes four comparators, four diodes, and a plurality of resistors associated with these integrators.

Addressing first those components associated with integrator 42, a first comparator $U_3$ is employed having its noninverting input connected to the output $V_{c2}$ of integrator 42 by a resistor $R_s$. The inverting input of comparator $U_3$, on the other hand, is connected to a positive offset voltage $V_{off1}$. A feedback resistor $R_f$ connects the noninverting input of comparator $U_3$ to the output of $U_3$. Finally, the output of comparator $U_3$ is connected to the positive lead of a diode $D_1$, whose negative lead is connected to the input of integrator 42.

Similarly, a second comparator $U_4$ also has its noninverting input connected to the output $V_{c2}$ of integrator 42 by a resistor $R_s$. The inverting input of comparator $U_4$ is connected to a negative offset voltage $V_{off2}$. A feedback resistor $R_f$ connects the noninverting input of comparator $U_4$ to the output of $U_4$. The output of comparator $U_4$ is also connected to the negative lead of a second diode $D_2$. The positive lead of diode $D_2$ is, in turn, connected to the input to integrator 42.

Addressing the portion of the sensing circuit 26 associated with integrator 50, a third comparator $U_5$ has its noninverting input connected to the output $V_{c1}$ of integrator 50 by a resistor $R_s$. The inverting input of comparator $U_5$ is connected to the positive offset voltage $V_{off1}$. A feedback resistor $R_f$, in turn, connects the noninverting input of comparator $U_5$ to the output of $U_5$. The output of comparator $U_5$ is also connected to the positive lead of a diode $D_3$, whose negative lead is connected to the input of integrator 50.

Finally, a fourth comparator $U_6$ has its noninverting input connected to the output $V_{c1}$ of integrator 50 by a resistor $R_s$. The inverting input of comparator $U_6$, on the other hand, is connected to the negative offset voltage $V_{off2}$. A feedback resistor $R_f$ connects the noninverting input of comparator $U_6$ to the output of $U_6$. The output of comparator $U_6$ is also connected to the negative lead of a diode $D_4$. The positive lead of diode $D_4$ is, in turn, connected to the input of integrator 50.

Discussing now the manner in which this sensing circuit 26 operates, comparators $U_3$, $U_4$, $U_5$, and $U_6$ are used as limit sensors. Suppose that the incident polarization causes each control voltage $V_{c1}$ and $V_{c2}$ to be at the midpoint of the output range of the corresponding integrators 50 and 42. Now suppose that the incident polarization changes in a manner that causes $V_{c1}$ or $V_{c2}$ to increase or decrease. Eventually, this voltage will reach the output limit of the integrator it is produced by.

At that point, a further change in the incident polarization would not be compensated by an adjustment in the phase shifters and the combiner 14 would be unable to continue tracking the incident polarization. Comparators $U_3$, $U_4$, $U_5$, and $U_6$ sense when voltages $V_{c1}$ and $V_{c2}$ approach the maximum and minimum integrator limits and cause the voltages $V_{c1}$ and $V_{c2}$ to change by an amount corresponding to 360 degrees. As a result, the combiner 14 continues to track the changing input polarization and the voltages $V_{c1}$ and $V_{c2}$ are no longer near their maximum or minimum limit.

Figure 14A:
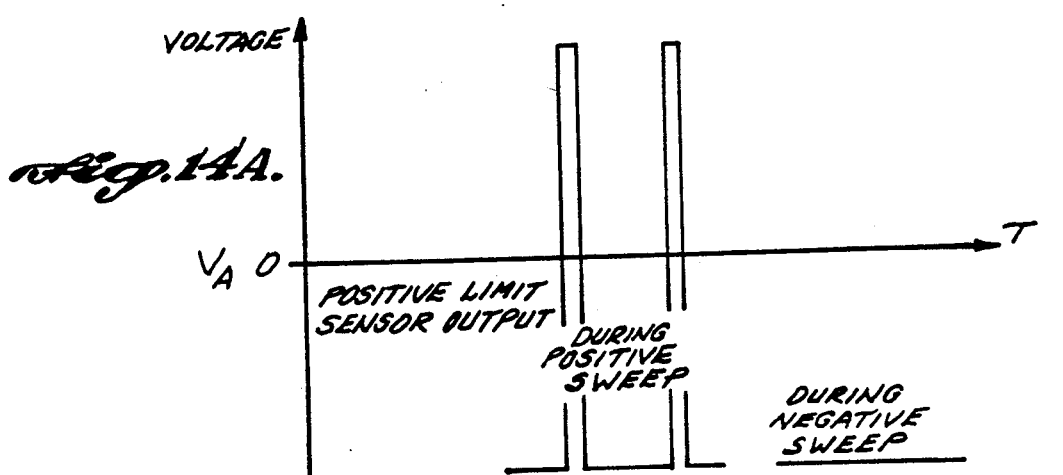
FIGS. 14A, 14B, and 14C graphically illustrate the operation of the limit set and sensing circuit included in FIG. 13 in response to different circumstances.
Figure 14B:
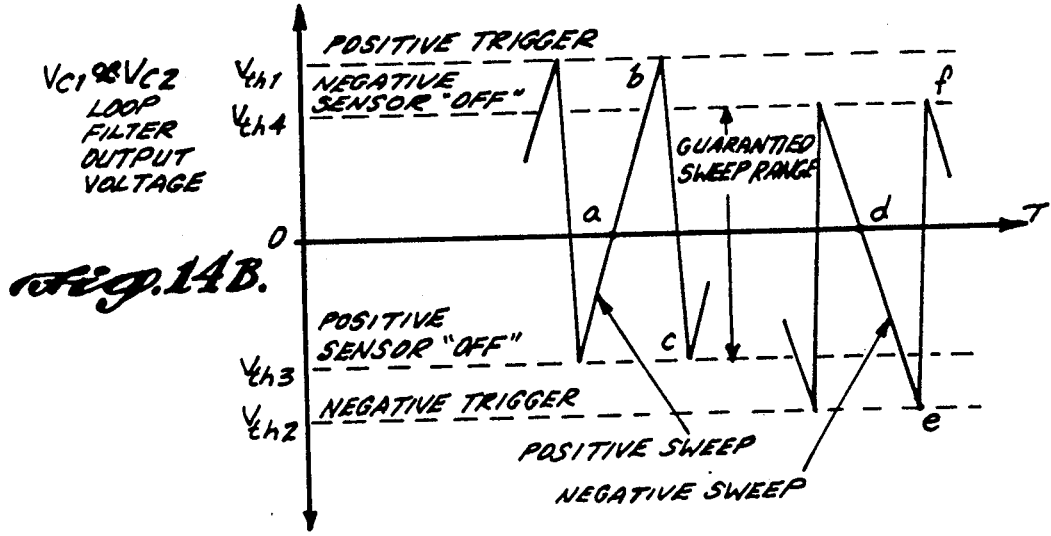
Figure 14C:
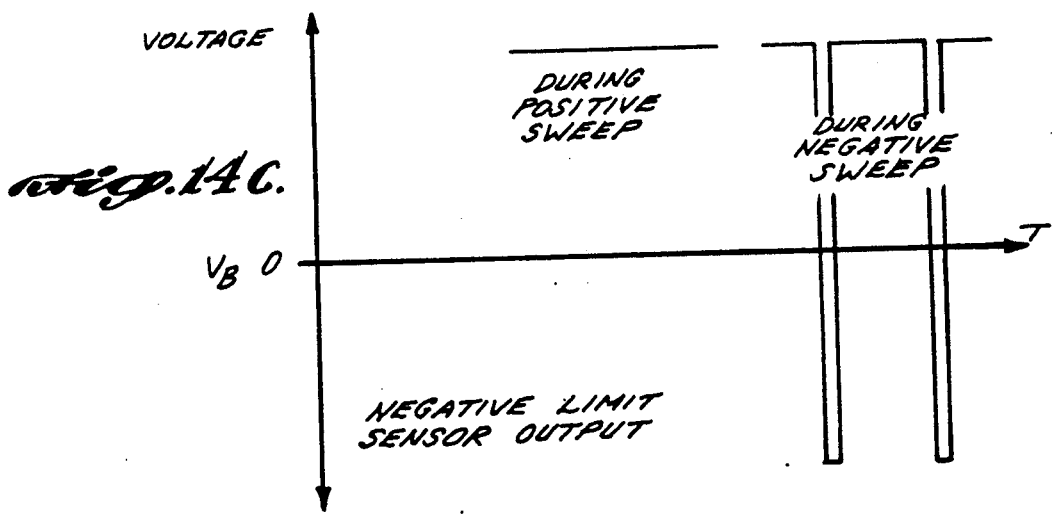

Discussing this in greater detail, the cooperative operation of those components associated with integrator 42 will first be reviewed. FIGS. 14A, 14B, and 14C represent, respectively, the output $V_A$ of comparator $U_3$, the output $V_{c2}$ of integrator 42, and the output $V_B$ of comparator $U_4$, all related by the same time axis.

Assume, for example, that the adaptive polarization combiner 14 is operating properly and that the feedback signal $V_{c2}$ produced by integrator 42 and applied to phase shifter 32 is at zero volts (see points a and d in FIG. 14B). This zero-volt signal is connected by resistor $R_s$ to the noninverting input of $U_3$, while the input to the inverting input of $U_3$ is at the positive offset voltage $V_{off1}$. Because $V_{off1}$ is greater than zero, comparator $U_3$ will be OFF and the output $V_A$ will be low (See FIG. 14A). Hence, diode $D_1$ is back-biased and not conducting. In this situation, comparator $U_3$ has no effect on the inputs to integrator 42.

The zero-volt feedback signal $V_{c2}$ is also connected by a resistor $R_s$ to the noninverting input of comparator $U_4$. With the negative offset voltage $V_{off2}$ applied to the inverting input of $U_4$, comparator $U_4$ will be ON and its output $V_B$ high. As a result, diode $D_2$ is also back-biased and nonconducting. Thus, comparator $U_4$, like comparator $U_3$, does not influence the inputs to integrator 42.

Assume now that the incident field polarization and, hence, input signals $V_{i1}$ and $V_{i2}$, change, causing detector 40 and integrator 42 to produce an output $V_{c2}$ that goes positive from point a in FIG. 14B as the combiner 14 tracks the slewing polarization. The resistors $R_s$ and $R_f$ associated with comparator $U_3$ form a voltage divider between the positive voltage $V_{c2}$ and the low output $V_A$ of comparator $U_3$. Thus, the voltage at the noninverting input of comparator $U_3$ is equal to the output $V_{c2}$ of integrator 42, minus the voltage drop across resistor $R_s$ of the divider. The magnitude of the voltage $V_{c2}$ required to make the voltage at the noninverting input of comparator $U_3$ equal to the positive offset voltage $V_{off1}$ is referred to as $V_{th1}$ in FIG. 14B.

As will be appreciated, when $V_{c2}$ exceeds $V_{th1}$ (point b in FIG. 14B), the comparator $U_3$ will switch ON, pulling its output $V_A$ high. At this point, diode $D_1$ will be forward biased and the output $V_A$, minus the voltage drop across diode $D_1$, will be applied to the inverting input of operational amplifier $U_1$. As a result, the output $V_{c2}$ of integrator 42 will drop between points b and c of FIG. 14B.

When the output $V_{c2}$ reaches point c, it is at another threshold voltage $V_{th3}$ associated with comparator $U_3$. At this point, the voltage divider formed by resistors $R_s$ and $R_f$ between voltages $V_{c2}$ and $V_A$ will cause the voltage at the noninverting input of comparator $U_3$ to fall below the offset voltage $V_{off1}$ applied to the inverting input. As a result, comparator $U_3$ will switch back OFF, back-biasing diode $D_1$. At point c, the output $V_{c2}$ causes phase shifter 32 to produce a phase shift that is approximately 360 degrees from that produced when $V_{c2}$ was at point b, and the lock is maintained. However, with $V_{c2}$ "reset," the combiner 14 is able to continue tracking the incident polarization without exceeding the input limits of the adjustable phase shifter 32.

As previously noted, with $V_{c2}$ initially zero, comparator $U_3$ will be OFF and $U_4$ will be ON. If the incident polarization then changes causing the output $V_{c2}$ of integrator 42 to decrease from point d in FIG. 14B, however, comparator $U_4$ will eventually turn OFF. This occurs at the point labeled e in FIG. 14B, where $V_{c2}$ is equal to a threshold voltage $V_{th2}$. As will be appreciated, the resistors $R_s$ and $R_f$ associated with comparator $U_4$ form a voltage divider between the high comparator output $V_B$ and the integrator output $V_{c2}$. At point e, this voltage divider provides a voltage to the noninverting input of comparator $U_4$ that is below the negative offset voltage $V_{off2}$ applied to the inverting input. As a result, comparator $U_4$ turns OFF dropping the output $V_B$ low.

The diode $D_2$ is thus forward biased and the output $V_B$, plus the voltage drop across diode $D_2$, is applied to the inverting input of operational amplifier $U_1$. As a result, the output $V_{c2}$ of integrator 42 will rise between points e and f in FIG. 14B until a second threshold voltage $V_{th4}$ associated with comparator $U_4$ is reached. At that point, the voltage divider formed by resistors $R_s$ and $R_f$ between voltage $V_{c2}$ and the low output $V_B$, will cause the voltage at the non-inverting input of comparator $U_4$ to rise back above the negative offset voltage $V_{off2}$ applied to the inverting input. As a result, comparator $U_4$ switches back ON, back-biasing diode $D_2$. At point f, the output $V_{c2}$ causes phase shifter 32 to produce a phase shift that is approximately 360 degrees from that produced when $V_{c2}$ was at point e, and the lock is maintained. However, with $V_{c2}$ "reset," the combiner 14 is able to continue tracking the incident polarization without exceeding the input limits of phase shifter 32.

As shown in FIG. 14B, the positive threshold voltage $V_{th4}$ associated with comparator $U_4$ is less than the positive threshold voltage $V_{th1}$ associated with comparator $U_3$. Similarly, the negative threshold voltage $V_{th3}$ associated with comparator $U_3$ is greater than the negative threshold voltage $V_{th2}$ associated with comparator $U_4$. Thus, the sensing circuit 26 exhibits a hysteretic operation in which retraces of the feedback voltage $V_{c2}$ initiated by comparator $U_3$ are switched "off" at a threshold $V_{th3}$ that occurs before the limit trigger $V_{th2}$ of comparator $U_4$ is reached. Similarly, retraces of the feedback voltage $V_{c2}$ initiated by comparator $U_4$ are switched off at a threshold $V_{th4}$ that occurs before the limit trigger $V_{th1}$ of comparator $U_3$ is reached.

As a result, the operation of comparator $U_3$ does not impact the operation of comparator $U_4$, and vice versa. In addition, by ensuring that this hysteretic operation encompasses a voltage range corresponding to a 360-degree phase shift, any change in incident polarization can be effectively compensated by the phase shifters. The maximum limits of the integrator and phase shifters no longer inhibit the circuit.

Turning now to a discussion of the portion of sensing circuit 26 coupled to integrator 50, as will be appreciated, its operation parallels the portion associated with integrator 42 discussed above. Thus, comparator $U_5$ controls the feedback control voltage $V_{c1}$ applied to phase shifter 28 so that it remains between thresholds $V_{th1}$ and $V_{th3}$ as the combiner 14 tracks slewing polarizations that cause $V_{c1}$ to rise. Comparator $U_6$, on the other hand, limits the feedback control voltage $V_{c1}$ to a range extending between $V_{th2}$ and $V_{th4}$ as the combiner 14 tracks slewing polarizations that cause $V_{c1}$ to fall.

The preceding discussion describes the operation of the feedback circuit 20 when both input signals $V_{i1}$ and $V_{i2}$ are present at the input to hybrid network 18. In this situation, the level set and sensing circuit 26 simply ensures that the outputs of integrators 42 and 50 are maintained within an acceptable range as the shift in response to changes in the incident field polarization and, hence, input signals $V_{i1}$ and $V_{i2}$.

In the event that input signals $V_{i1}$ and $V_{i2}$ disappear, the inherent offset in amplifiers $U_1$ and $U_2$ is no longer overcome and will cause the outputs $V_{c2}$ and $V_{c1}$ of integrators 42 and 50 to rise or fall, depending on the direction of the inherent offset. The comparators $U_3$, $U_4$, $U_5$, and $U_6$ again limit $V_{c1}$ and $V_{c2}$ to the threshold limits discussed above in connection with FIG. 14. As a result, the integrator outputs $V_{c1}$ and $V_{c2}$ will continuously sweep through a lock range until the signals $V_{i1}$ and $V_{i2}$ reappear, allowing lock to be promptly reestablished.

This aspect of the operation of circuit 26 could create problems, however. If one input is absent, the limit-sensing circuit will sweep the control voltages $V_{c1}$ and $V_{c2}$ through their adjustment range repeatedly in an attempt to find a signal. As a result, the polarization combiner 14 will operate in a sweep mode while waiting for both input signals $V_{i1}$ and $V_{i2}$ to appear, introducing an undesirable phase modulation into the output signal as described in greater detail below. Thus, the sensing circuit 26 is preferably constructed to ensure that the polarization combiner 14 operates properly in the absence of one of the input signals $V_{i1}$ or $V_{i2}$.

More particularly, assume that only one of the two input signals $V_{i1}$ or $V_{i2}$ is present. Hybrid 30 will respond by producing equal amplitude, orthogonal signals at output ports h3 and h4. This should normally result in the production of the desired orthogonal, equal amplitude signals at the input ports h1 and h2 of hybrid 34. As a result of circuit component imperfections, however, some measurable null output $V_\Delta$ will be produced at the output port h4 of hybrid 34. This null output $V_\Delta$ will, in turn, be fed back to phase shifters 28 and 36 via detector 48, integrator 50, and inverting amplifier 52 in an effort to eliminate the null output $V_\Delta$.

Because one of the inputs $V_{i1}$ or $V_{i2}$ is absent, however, no phase adjustment can be accomplished. Given the sweeping characteristic of integrator 50 and sensing circuit 26, the feedback loop will continually adjust phase shifters 28 and 36, producing a phase-modulated output signal and a degradation of the null. To avoid this condition, the embodiments of combiner 14 shown in FIGS. 15 and 16 can be employed.

Figure 15:
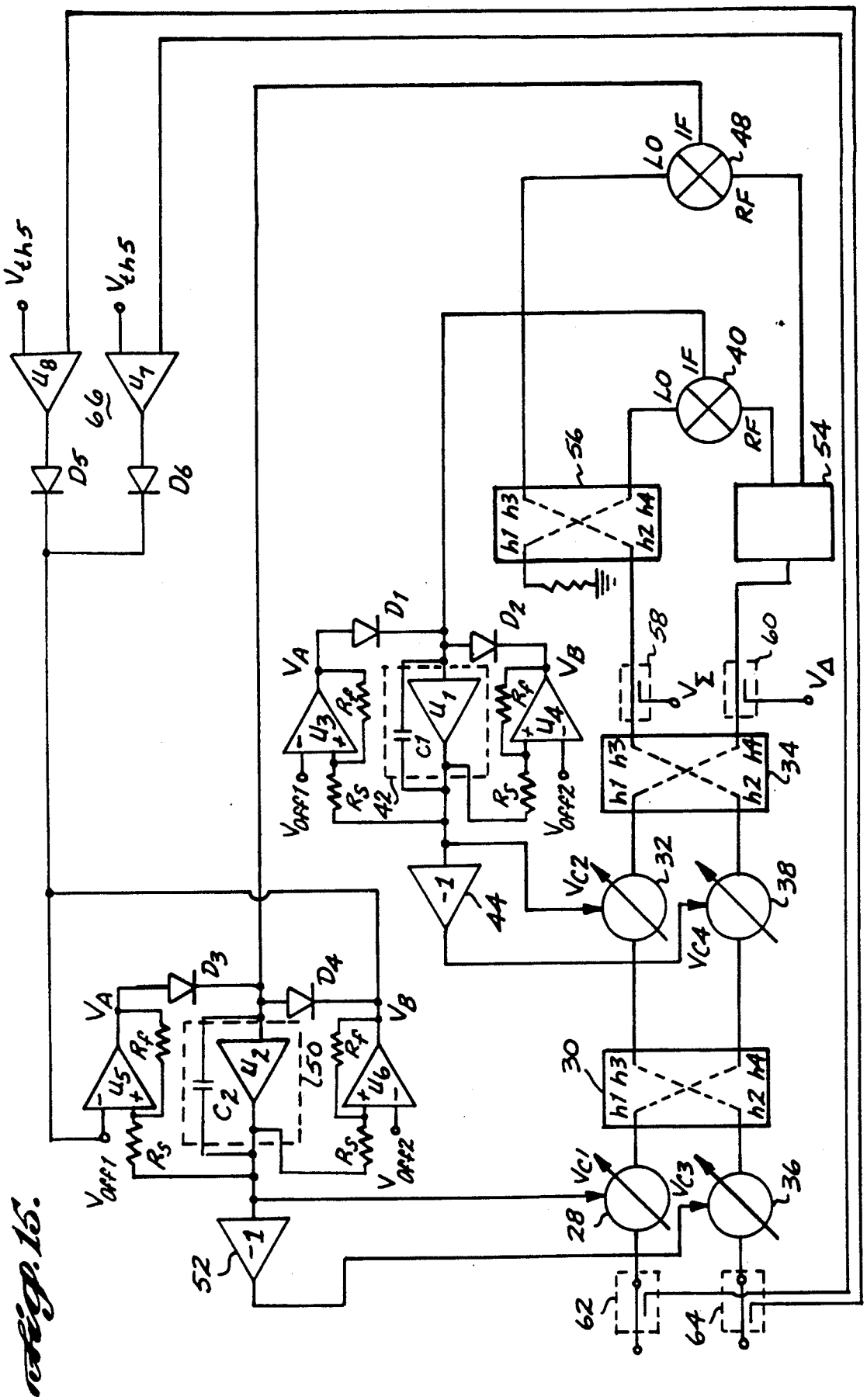
FIG. 15 is a more detailed diagram of the adaptive polarization combiner of FIG. 13, including a sweep disable circuit for providing the desired operation of the combiner when one of the inputs is absent.

Addressing first the configuration shown in FIG. 15, a first channel input sensor 62 is coupled to the input of phase shifter 28 to sense the presence of input signal $V_{i1}$. Similarly, a second channel input sensor 64 is coupled to the input of phase shifter 36 to detect the presence of input $V_{i2}$. If either of these signals is absent, a disable circuit 66 provides a sweep disable signal to the sensing circuit 26, preventing the circuit from sweeping the feedback signal $V_{c1}$ until both inputs $V_{i1}$ and $V_{i2}$ are again present. Functionally, disable circuit 66 accomplishes this by maintaining diodes D3 and D4 in their back-biased condition until both inputs $V_{i1}$ and $V_{i2}$ are again sensed.

Discussing this arrangement in greater detail, as shown in FIG. 15, the disable circuit 66 includes fifth and sixth comparators U7 and U8 as well as diodes D5 and D6. More particularly, the output of the first channel input sensor 62 is connected to the noninverting input of comparator U7, while the inverting input of comparator U7 is connected to a threshold voltage $V_{th5}$. Similarly, the output of the second channel input sensor 64 is connected to the non-inverting input of a comparator U8, while the inverting input of comparator U8 is connected to the threshold voltage $V_{th5}$. The outputs of comparators U7 and U8 are connected to the positive leads of diodes D5 and D6, respectively.

As will be appreciated, the threshold voltage $V_{th5}$ is established so that the outputs of comparators U7 and U8 will remain low as long as both inputs $V_{i1}$ and $V_{i2}$ are present. In the event either input disappears, however, the voltage from the corresponding input sensor 62 or 64 will fall bellow the threshold voltage $V_{th5}$, causing the comparator output to swing high. As a result, current is conducted through the corresponding diode D5 or D6.

Because diodes D5 and D6 are connected directly to the output of comparator U6, the diode D4 will be back-biased, disabling the negative portion of the sweep circuit. Similarly, because the junction of diodes D5 and D6 is coupled to the inverting input of amplifier U5, the output of amplifier U5 is kept low and diode D3 is back-biased. As a result, the sweeping portion of the sensing circuit 26 associated with integrator 50 and phase shifters 28 and 36 is disabled.

Another arrangement developed to detect the absence of one of the input signals, and disable the sweeping portion of the sensing circuit accordingly, is show in FIG. 16. This circuit relies on the following property of hybrid network 18. When one of the two inputs $V_{i1}$ or $V_{i2}$ is absent, equal amplitude orthogonal phase signals are applied to the inputs h1 and h2 of hybrid 34. Although there may be some minor degradation of the null as a result of component imperfections, only a very small null signal $V_\alpha$ will be produced. The IF output of the synchronous amplitude detector 48 can then be monitored to ensure that it does not exceed this intrinsic signal level, established initially as a threshold via calibration. If the IF output of detector 48 is below this threshold, either hybrid network 18 has properly adjusted phase shifters 28, 32, 36, and 38, or no input signals are present. In either event, the sweeping portion of circuit 26 can be disabled. As a result, sweeping occurs only when at least one input is present and no null has been formed.

To accomplish this, the IF output of synchronous amplitude detector 48 is applied to the noninverting input of sensing comparator U9 and the inverting input of comparator U10, as shown in FIG. 16. A negative threshold voltage $V_{th6}$ is applied to the inverting input of comparator U9, while a positive threshold voltage $V_{th7}$, having the same magnitude as $V_{th6}$ but opposite in sign, is applied to the noninverting input of amplifier U10. The outputs of comparators U9 and U10 are joined by diodes D7 and D8, respectively. The junction of the diodes is then connected to the output of the comparator U6 used in connection with integrator 50 and to the inverting input of the sensing comparator U5.

As long as the IF output of synchronous amplitude detector 48 falls between thresholds $V_{th6}$ and $V_{th7}$, the outputs of comparators U9 and U10 will remain high and the sweeping portion of circuit 26 will be disabled. With the sweep function disabled, the integrator continues to function and is able to track changes in the incident polarization at least until the integrator output begins to limit. The thresholds $V_{th6}$ and $V_{th7}$ are established so that this disablement of the sweep function occurs in response to three input conditions.

The first of these input conditions is when neither input $V_{i1}$ nor $V_{i2}$ is present. As will be appreciated, a "nominal" null output signal $V_\Delta$ is produced, having a magnitude that is proportional only to system noise. The second input condition occurs when both inputs $V_{i1}$ and $V_{i2}$ are present and the combiner 14 has been successful in combining them in the desired fashion to produce a nominal null.

Finally, a nominal null output $V_\Delta$ is also produced when only one of the input signals $V_{i1}$ or $V_{i2}$ is absent. In response to this third input condition, equal amplitude orthogonal phase inputs are automatically provided to ports h1 and h2 of hybrid 34, causing the IF output from synchronous amplitude detector 48 to fall between thresholds $V_{th6}$ and $V_{th7}$. As will be appreciated, none of the three input conditions requires a sweep capability.

As the incident polarization changes, causing corresponding changes in the relative amplitude and phase of input signals $V_{i1}$ and $V_{i2}$, the magnitude of the output of detector 48 may increase to the point where either threshold $V_{th6}$ or $V_{th7}$ is crossed. At that point, the output of the corresponding comparator $U_9$ or $U_{10}$ will switch low and the sweeping portion of circuit 26 will be enabled. This condition occurs only if at least one input signal $V_{i1}$ or $V_{i2}$ is present and a nominal null is no longer produced.

As will be appreciated, the sweep enable/disable schemes employed by the circuits illustrated in FIGS. 15 and 16 are entirely different. The approach taken by the combiner 14 in FIG. 15 involves the use of input sensors 62 and 64 to directly detect the absence of either input signal $V_{i1}$ or $V_{i2}$ and disable the sweep portion of circuit 26 when that condition occurs.

In contrast, the approach adopted by the combiner 14 of FIG. 16 does not directly sense the input signals $V_{i1}$ and $V_{i2}$ but, instead, relies upon the fact that the sweep capability is not needed when a suitable null output $V_\Delta$ is produced. Such a null output $V_\Delta$ is formed when only one input signal is present, when neither input signal is present, or when both input signals are present and properly combined. Thus, although the arrangement may be described for the purpose of this discussion as detecting the absence of one of the input signals $V_{i1}$ or $V_{i2}$, the circuit more accurately detects the presence of a nominal null output $V_\Delta$ that occurs when one of three different input conditions is present.

As previously discussed, the limit set and sensing circuit 26 enhances several aspects of the operation of adaptive polarization combiner 14. For example, because circuit 26 is able to sweep the feedback signals used to control phase through set ranges, the adaptive polarization combiner 14 remains responsive to substantially any change in the incident field's polarization, even though it employs components having limited operating ranges. More importantly, however, circuit 26 disables the sweep function when one of the input signals $V_{i1}$ or $V_{i2}$ is absent, allowing the combiner 14 to continue operating properly.

Those skilled in the art will recognize that the embodiments of the invention disclosed herein are exemplary in nature and that various changes can be made therein without departing from the scope and the spirit of the invention. In that regard, and as was previously mentioned, the invention is readily embodied with sensors that sense the input signals at either the input to the system or via the IF output of the phase detector. Further, it will be recognized that other implementations for disabling the sweep circuit in response to the loss of an input signal can be employed. Also, the combiner 14 functions equally well if hybrids 30 and 34 are 180-degree hybrids, rather than 90-degree hybrids. Furthermore, the polarization combiner 14 can be used with any two input signals of arbitrary relative phase and amplitude to combine the signals for maximum signal-to-noise ratio, e.g., to minimize the effects of multipath, assuming spatial diversity. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. An adaptive polarization combiner for combining first and second input signals corresponding to orthogonally polarized components of an incident electromagnetic field to produce a sum output signal, having substantially all of the power of the input signals, and a null output signal, said combiner comprising:
   (a) hybrid network means for receiving the first and second input signals and producing the sum and null output signals in response thereto and for compensating for variations in the phase and magnitude of the first and second input signals, said hybrid network means including:
      (i) a first hybrid having first and second input ports and first and second output ports:
      (ii) a second hybrid having first and second input ports and sum and null output ports:
      (iii) a first phase shifter having an input port, an output port, and a control port:
      (iv) a second phase shifter having an input port, an output port, and a control port:
      (v) a third phase shifter having an input port, an output port, and a control port; and
      (vi) a fourth phase shifter having an input port, an output port, and a control port, the first input signal being received by said input port of said first phase shifter, said output port of said first phase shifter being connected to said first input port of said first hybrid, the second input signal being received by said input port of said third phase shifter, said output port of said third phase shifter being connected to said second input port of said first hybrid, said first output port of said first hybrid being connected to said input port of said second phase shifter and said output port of said second phase shifter being connected to said first input port of said second hybrid, said second output port of said first hybrid being connected to said input port of said fourth phase shifter and said output port of said fourth phase shifter being connected to said second input port of said second hybrid, the sum output signal being produced at said sum output port of said second hybrid and the null output signal being produced at said null output port of said second hybrid:
   (b) sensing means for monitoring the operation of said hybrid network means and for ensuring that said hybrid network means operates properly when one of the first and second input signals is absent; and
   (c) null detector means for controlling said hybrid network means in response to the sum and null output signals, said null detector means including:
      first synchronous amplitude detector means for producing a first control signal indicative of the amplitude of the in-phase portion of the null output signal relative to the sum output signal, said first synchronous amplitude detector means having a first input port coupled to said sum output port of said second hybrid, a second input port coupled to said null output port of said second hybrid, and an output port coupled to said control port of said second phase shifter;
      ninety-degree phase shift means having an input port connected to said sum output port of said second hybrid and a first output port; and
      second synchronous amplitude detector means for producing a second control signal indicative of the amplitude of the quadrature portion of the null output signal relative to the sum output signal, said second synchronous amplitude detector means having a first input port connected to said output port of said ninety-degree phase shift means, a second input port coupled to said null output port of said second hybrid, and an output port coupled to said control port of said first phase shifter.

2. The combiner of claim 1, wherein said ninety-degree phase shift means comprises a third hybrid having an input port, a first output port, and a second output port, said first output port of said third hybrid being connected to said first input port of said second synchronous amplitude detector means, said second output port of said third hybrid being connected to said first input port of said first synchronous amplitude detector means.

3. The combiner of claim 2, wherein said null detector means further comprises:
first integrator means for integrating said first control signal to produce a first integrator output, said first integrator means having an input port coupled to said output port of said first synchronous amplitude detector means and an output port coupled to said control port of said second phase shifter;
first inversion means for inverting said first integrator output and applying the inverted first integrator output to said control port of said fourth phase shifter;
second integrator means for integrating said second control signal to produce a second integrator output, said second integrator means having an input port coupled to said output port of said second synchronous amplitude detector means and an output port coupled to said control port of said first phase shifter; and
second inversion means for inverting said second integrator output and applying the inverted second integrator output to said control port of said third phase shifter.

4. The combiner of claim 3, wherein said null detector means further comprises:
limit detection means, coupled to said output ports of said first and second integrator means, for monitoring said first and second integrator outputs and adjusting said first and second integrator outputs to a level suitable for use by said first, second, third, and fourth phase shifters.

5. The combiner of claim 4, wherein said sensing means comprises null threshold detection means for comparing the null output signal at said null output port of said second hybrid with a threshold and disabling said limit detection means only when said threshold is not exceeded.

6. The combiner of claim 1, wherein said sensing means comprises first and second sensing circuits, coupled to said input ports of said first and third phase shifters, for directly sensing the presence of said first and second input signals and maintaining said first and second control signals in the event one of said first and second input signals is not present.

7. An adaptive polarization combiner for combining first and second input signals corresponding to orthogonally polarized components of an incident electromagnetic field to produce a sum output signal, having substantially all of the power of the input signals, and a null output signal, said combiner comprising:
hybrid network means for receiving the first and second input signals and producing the sum and null output signals in response thereto and for compensating for variations in the phase and magnitude of the first and second input signals;
sensing means for monitoring the operation of said hybrid network means and for ensuring that said hybrid network means operates properly when one of the first and second input signals is absent; and
null detector means for controlling said hybrid network means in response to the sum and null output signals by producing a control signal that is applied to said hybrid network means, said null detector means sweeping said control signal through a range of values when the null output signal exceeds a predetermined threshold, said sensing means being further for monitoring the first and second input signals and for producing a disable signal in the event that either input signal is absent, said sensing means applying said disable signal to said null detector means to discontinue sweeping said control signal.

8. A method of combining first and second input signals having arbitrary relative phase and amplitude to produce a sum output signal, having substantially all of the power of the input signals, and a null output signal, said method comprising the steps of:
controllably combining the first and second input signals to produce the sum and null output signals in response to at least one control signal;
monitoring the sum and null output signals to produce the control signal;
sweeping the control signal over a range of values when the desired null output signal is not produced; and
discontinuing the sweeping of the control signal in response to the status of at least one of the input and output signals detected by the step of comparing the null output signal to a threshold level whose magnitude is greater than the magnitude of the null output signal produced when one of the input signals is absent.

9. An adaptive polarization combiner, for combining first and second input signals corresponding to orthogonally polarized components of an incident electromagnetic field to produce a sum output signal, having substantially all of the power of the input signals, and a null output signal, said combiner comprising:
hybrid network means for receiving the first and second input signals and producing the sum and null output signals in response thereto and for compensating for variations in the phase and magnitude of the first and second input signals:
sensing means for monitoring the operation of said hybrid network means and for ensuring that said hybrid network means operates properly when one of the first and second input signals is absent; and
null detector means for controlling said hybrid network means in response to the sum and null output signals by producing a control signal that is applied to said hybrid network means, said null detector means sweeping said control signal through a range of values when the null output signal exceeds a predetermined threshold, said sensing means being further for monitoring the null output signal and for producing a disable signal in the event that the null output signal is below the predetermined threshold, said sensing means applying said disable signal to said null detector means to discontinue sweeping said control signal.

10. A method of combining first and second input signals having arbitrary relative phase and amplitude to produce a sum output signal, having substantially all of the power of the input signals, and a null output signal, said method comprising the steps of:

controllably combining the first and second input signals to produce the sum and null output signals in response to at least one control signal;

monitoring the sum and null output signals to produce the control signal;

sweeping the control signal over a range of values when the desired null output signal is not produced; and discontinuing the sweeping of the control signal in response to the absence of one of the input signals detected by the step of sensing the presence of the input signals before they are controllably combined.

* * * * *

UNITED STATES PATENT AND TRADEMARK OFFICE
CERTIFICATE OF CORRECTION

PATENT NO. : 5,036,331
DATED : July 30, 1991
INVENTOR(S) : K. A. Dallabetta et al.

It is certified that error appears in the above-identified patent and that said Letters Patent is hereby corrected as shown below:

| COLUMN | LINE | ERROR |
|---|---|---|
| 4 | 29 | after "system" insert --signal-- |
| 5 | 51 | "ration" should be --ratio-- |
| 11 | 9 | "quality" should be --equality-- |
| 16 | 8 | "show" should be --shown-- |
| 16 | 15 | "$V_\alpha$" should be --$V_\Delta$-- |
| 19 (Claim 7) | 58 (Line 1) | "combiner" should be --combiner,-- |

Signed and Sealed this

Ninth Day of March, 1993

Attest:

STEPHEN G. KUNIN

*Attesting Officer*     *Acting Commissioner of Patents and Trademarks*